March 12, 1968   E. W. GEISZ ET AL   3,373,334
REGULATED D.C. TO D.C. POWER SUPPLY
Filed June 1, 1965   3 Sheets-Sheet 3
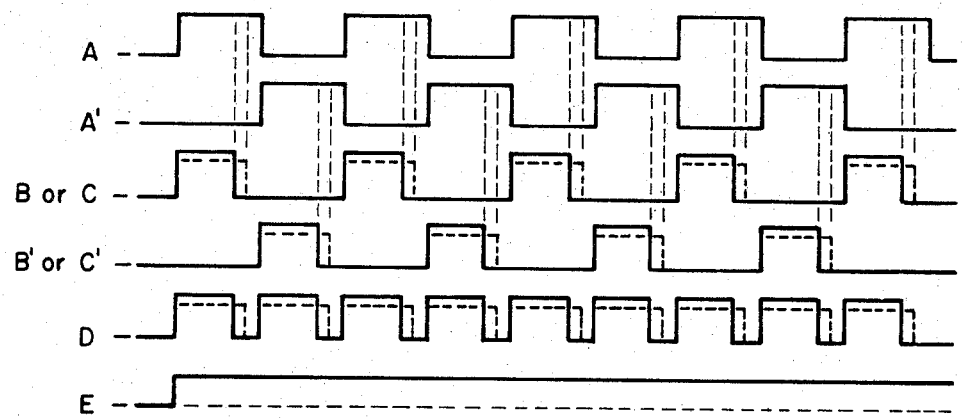
Fig. 3   V_IN VARIES
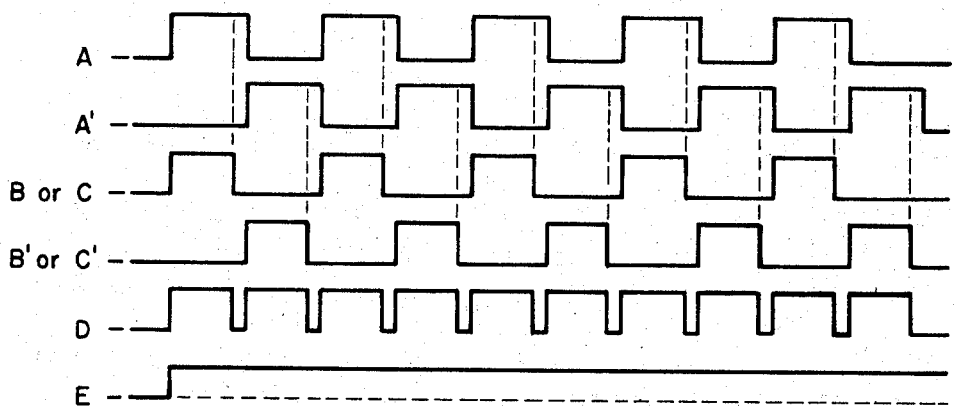
Fig. 4   V_OUT DECREASES
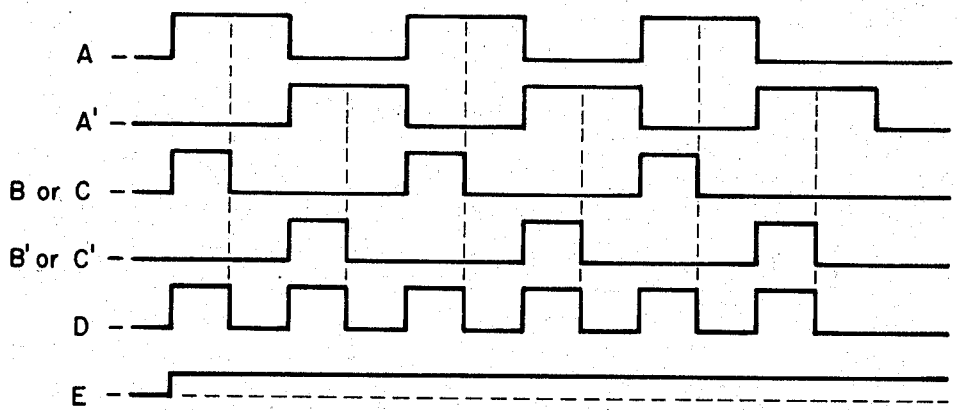
Fig. 5   V_OUT INCREASES

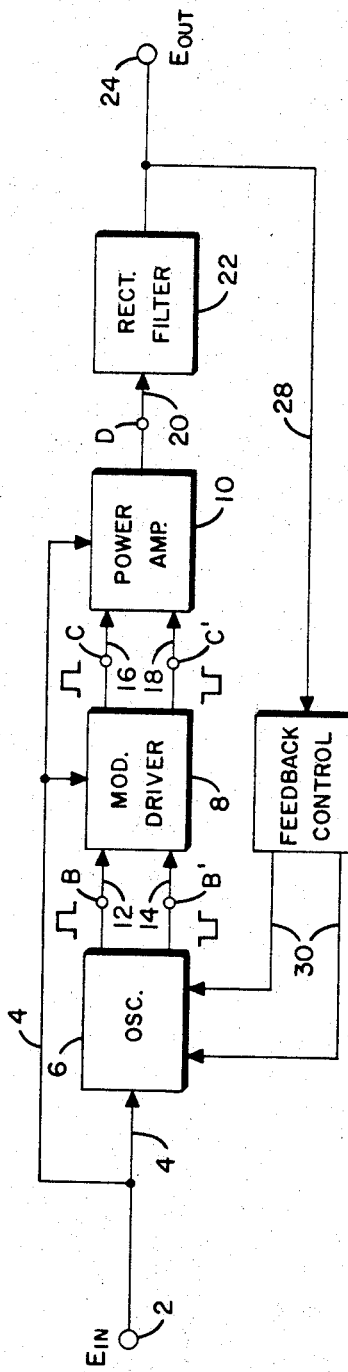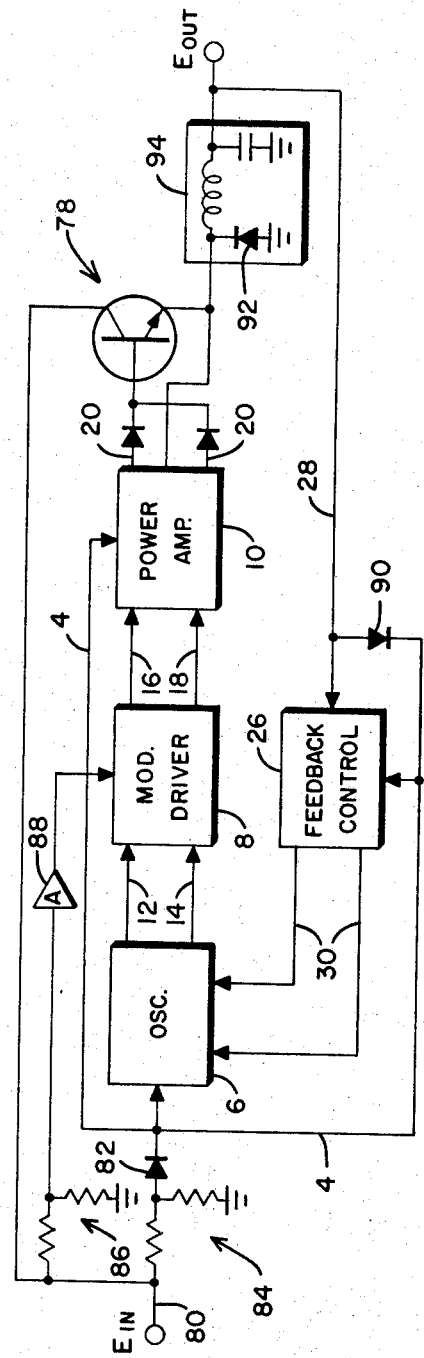

United States Patent Office 3,373,334
Patented Mar. 12, 1968

3,373,334
REGULATED D.C. TO D.C. POWER SUPPLY
Eugene W. Geisz, South St. Paul, and Walter C. Timm, Minneapolis, Minn., assignors to Sperry Rand Corporation, New York, N.Y., a corporation of Delaware
Filed June 1, 1965, Ser. No. 459,991
2 Claims. (Cl. 321—2)

ABSTRACT OF THE DISCLOSURE

A D.C. to D.C. converter which regulates output voltage against input voltage variations by providing a saturable reactor which produces square wave voltage pulses which are pulse-width modulated depending upon the amplitude of the input supply voltage thereby providing an output pulse which has a constant voltage-time product. The D.C. output of the power supply is regulated against load variations by providing a transformer-coupled oscillator whose frequency determines the output voltage by driving the reactor and which frequency is changed in accordance with a change in the output voltage.

---

This invention relates generally to power supplies and more specifically to an improved control for a D.C. to D.C. converter and an improved control for a switching regulator circuit.

In many applications today and in particular to the aerospace field where weight and space are limiting factors, it is imperative that circuit designs utilize a minimum of components in order to perform the desired function. Power supplies in particular are generally large and heavy.

The first embodiment of the present invention relates to a power supply which provides significant regulation of output voltages in view of both load changes and input voltage changes with a minimum of circuitry and components. Further, output voltages are D.C. isolated from input voltages. Coupled with high frequency operation, the invention provides a significant reduction in volume and weight of D.C. to D.C. converters without sacrificing regulation or efficiency.

The major elements of the D.C. to D.C. power converter are an oscillator, a modulator-driver, a power amplifier, a rectifier-filter circuit, and a feedback control.

The oscillator, an astable transformer-coupled multivibrator free-running at about 20,000 cycles per second provides complementary square wave voltage pulses to the modulator-driver stage. Higher or lower frequencies could be used depending on power and weight considerations. The value of 20,000 cycles is not intended to be limiting. The modulator-driver pulse width modulates the square wave pulses depending upon the amplitude of the input supply voltage and drives the width-modulated pulse into the power amplifier stage. Thus, even though the input supply voltage may increase or decrease, the modulator-driver provides complementary output pulses which always contains the same voltage-second product. The output of the power amplifier is in the form of complementary square wave pulses which are transformed, rectified and filtered to become the output D.C. voltage. Concurrently, the D.C. output voltage is monitored by the feedback control circuitry and compared with a reference voltage. If the output voltage is not of equal magnitude with the reference voltage, an error signal is fed back to the oscillator which causes it to change frequency. This frequency change in turn causes the pulses produced by the modulator-driver to be either closer together or farther apart in time which causes the average D.C. output level to either increase or decrease.

A second embodiment of the present invention relates to a switching regulator circuit. Switching regulator circuits are used to reduce a high input voltage to a lower regulated output voltage. The input voltage is coupled to a switch which is turned on and off to produce voltage pulses which are filtered to provide a D.C. output voltage. The duty cycle of the switch determines the value of the D.C. output. Obviously, if the D.C. output level is to be increased, the switch must be turned on for longer periods of time, i.e. the duty cycle must be increased. Conversely, if the D.C. output level is to be decreased, the switch must be turned off for longer periods of time, i.e. the duty cycle must be decreased. The prior art switches include a multivibrator directly coupled to a switching transistor to turn it on and off. The problem with this type of circuit is that it is inefficient to drive the switching transistor by direct coupling where high voltages are involved since the base voltage of the switching transistor must be close to the supply voltage from which the circuit is working and thus a large power loss occurs in the base circuit. This problem could be resolved by transformer coupling the drive circuit to the base of the switching transistor. The D.C. output voltage developed is then used to vary the multivibrator frequency which, in turn, controls the on-off time of the transistor through the transformer to regulate the output voltage. However, with this type of control, another problem arises. Since there is no output voltage initially, there is no feedback voltage to control the multivibrator and it fails to oscillate until the proper output voltage is developed. Therefore, the transformer which couples the multivibrator to the transistor must be large enough to support the driving voltage until an output voltage is developed and a feedback voltage is obtained. Thereafter the multivibrator begins to operate and the pulses produced by the duty cycle of the multivibrator are coupled by the transformer to the switching transistor. It is obvious then that the transformer must be wound such that it will not saturate in the time interval necessary to build up an output voltage which will charge up the filter capacitor and develop a feedback voltage.

Thus, while it is desirable to transformer couple the multivibrator to the switching transistor, it is difficult to start the system without using a physically large transformer. The circuit of the present invention may be used advantageously in a switching circuit to overcome the above disadvantages and yet use a small transformer to couple the control circuit to the switching transistor. Also, in the prior art systems, no regulation of input voltage variations occurs until such variations are detected in the output voltage. In the present system, there is open loop regulation of the input voltage variations by pulse width modulation as well as closed loop regulation of the output voltage by frequency variation.

Thus, it is an object of the present invention to provide an efficient positive means of regulating a D.C. to D.C. power converter using a minimum of circuitry.

It is another object of the present invention to provide a D.C. to D.C. converter which regulates the output voltage against input voltage variations by providing square wave voltage pulses which are pulse-width modulated depending upon the amplitude of the input supply voltage.

It is still another object of the present invention to regulate the D.C. output of a power supply against load variations by providing an oscillator whose frequency determines the output voltage and which frequency is changed in accordance with a change in the output voltage.

It is also an object of the present invention to provide a saturable core transformer-coupled oscillator for supplying D.C. power to a load circuit and for using deviations from a normal value in the output voltage to control the frequency of the oscillator and hence the average value of the D.C. output voltage.

It is a further object of the present invention to provide a feedback control whose output is magnetically coupled to the transformer coupled oscillator in order to change the frequency of operation of the oscillator depending upon the variation of the D.C. output voltage.

It is still a further object of this invention to provide a saturable core transformer as a modulator-driver which accepts square wave inputs and produces output pulses which vary in magnitude and length but whose voltage-time product remains constant even though the input voltage varies.

It is yet another object of the present invention to provide a switching regulator circuit which will enable the use of a transformer to control the switch without requiring the transformer to be unduly large.

Other objects and advantages will be disclosed in the course of the following specification, reference being had to the accompanying drawings, in which:

FIG. 1 shows the inventive D.C. to D.C. converter in block diagram form;

FIG. 3 shows the voltage waveforms at various points in the circuit of FIG. 2 as the input voltage both increases and decreases;

FIG. 4 shows the voltage waveforms at various points in the circuit of FIG. 2 as the output voltage decreases;

FIG. 5 shows the voltage waveforms at various points in the circuit of FIG. 2 as the output voltage increases; and FIG. 6 shows in block diagram form a second embodiment of the inventive circuit which relates to a switching regulator circuit.

Figure 2:
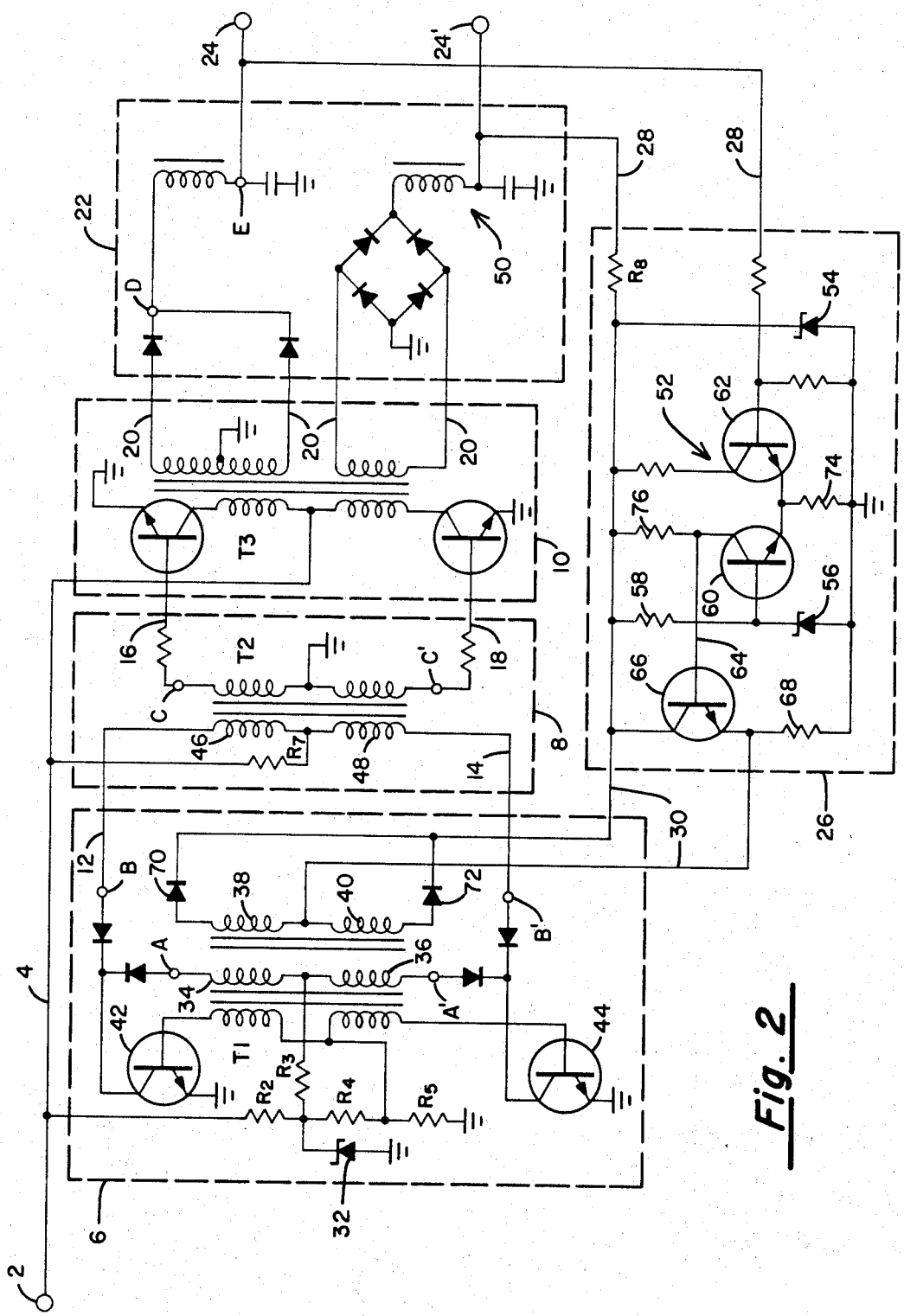
FIG. 2 is a detailed circuit diagram of the D.C. to D.C. converter.

Referring generally to FIG. 1 there is shown in block diagram the D.C. to D.C. converter including input terminal 2 which receives the input D.C. voltage. This voltage is coupled via line 4 to oscillator 6 modulator-driver 8, and power amplifier 10. Oscillator 6 is a conventional transformer-coupled oscillator or multivibrator which utilizes a magnetic core of substantially rectangular hysteresis loop material having a plurality of windings thereon. Oscillator 6 produces complementary square wave output pulses which are coupled to modulator-driver 8 via lines 12 and 14. Modulator-driver 8 includes a transformer constructed of a square loop core material and is wound such that it will saturate in a certain percentage of the time during which the pulses from oscillator 6 are present. This percentage is a function of the desired range over which the input voltage is to be regulated and will lessen for a wider range and increase for a lesser range. Nominally it may be 80%. Thus, modulator-driver 8 produces complementary square wave output pulses on lines 16 and 18 whose amplitude varies with and is directly proportional to the magnitude of the input supply voltage and, since the time required for the modulator-driver transformer to saturate is inversely proportional to the voltage impressed across it, as the supply voltage increases the pulse width decreases and, conversely, as the supply voltage decreases, the pulse width increases. Therefore, the product of the voltage applied to the modulator-driver transformer and the length of time that it is impressed thereon is held constant even though the voltage level of the supply voltage changes. Thus even though the input voltage increases or decreases, the square wave output pulses from modulator-driver 8 always contain the same voltage-time product and therefore when averaged over a complete cycle, produce a constant output voltage. These pulses are coupled via lines 16 and 18 to power amplifier 10 where they are amplified and coupled via line 20 to rectifier-filter circuit 22 and the regulated D.C. output voltage appears on terminal 24.

Feedback control circuit 26 is coupled via line 28 to output terminal 24. The feedback circuitry monitors the D.C. output voltage and continually compares it with a reference voltage. If the output voltage varies with respect to the reference voltage, signals are produced on lines 30 which are coupled to one of the transformer windings comprising oscillator 6 and the frequency of the oscillator is changed. If the monitored D.C. voltage becomes less than the reference due to load changes or component deterioration, etc., the frequency of the oscillator stage increases. Since the output pulses on lines 12 and 14 will then be produced by oscillator 6 at a faster rate, and since modulator-driver 8 produces output pulses on lines 16 and 18 at the same rate at which it receives the square wave pulses from oscillator 6, the output pulses on lines 16 and 18 will be of constant magnitude and width but will be closer together in time thus raising the average signal level at the output of rectifier-filter circuit 22 and, therefore, increasing the output voltage. In a like manner, if the monitored D.C. voltage becomes greater than the reference, the frequency of the oscillator stage decreases and the output voltage is decreased. With this method of feedback control, the output D.C. voltage can be regulated and controlled while maintaining a complete D.C. isolation between the input supply voltage circuit and the output circuit.

FIG. 2 shows the circuit details of the D.C. to D.C. converter. Like elements in FIGS. 1 and 2 are numbered alike for ease of identification. The input D.C. voltage present on terminal 2 is coupled to oscillator 6, modulator-driver 8, and power amplifier 10 via line 4. Resistors R2, R4, and R5 form a series circuit to ground to establish proper bias voltages for the operation of oscillator 6. Zener diode 32 is coupled between ground and the junction of resistors R2 and R4 to establish a potential which is constant even though the input voltage may vary. In actual practice, diode 32 may not be needed for reasons which will be given later. Also instead of a constant voltage being applied to T1 through R3, a constant current source could be coupled to T1 and the same result would be achieved. The constant voltage is applied through R3 to coils 34 and 36 of transformer T1 which causes oscillator 6 to oscillate at a particular frequency such as 20,000 cycles per second. This frequency is constant and will change only if the voltage across coils 34 and 36 is changed by the output from feedback control circuit 26 which is coupled to coils 38 and 40 of transformer T1. Thus, assuming transistor 42 to be conducting, when coil 34 of transformer T1 saturates, transistor 42 is abruptly shut off and transistor 44 abruptly begins to conduct. Transistor 44 will continue to conduct until such time as coil 36 of transformer T1 saturates and at which time transistor 44 is abruptly cut off and transistor 42 again begins to conduct. It can therefore be seen that oscillator 6 will produce square wave pulses on lines 12 and 14 which are coupled in push-pull arrangement to modulator-driver 8.

Modulator-driver 8 includes transformer T2 which is constructed of a square loop core material and is wound such that with the nominal value of the input supply voltage impressed on the series combination of resistor R7 and primary winding 46 or 48 of transformer T2, the core will nominally saturate in about 80% of the time that transistor 42 or 44 is in the ON state. During the time that winding 46 or 48 is not saturated, either winding will present a much higher impedance to the input voltage than will resistor R7. Thus, the current through R7 remains essentially constant before saturation and the voltage across the primary winding 46 or 48 is directly proportional to the input supply voltage. It is well known that $$E = N \frac{d\phi}{dt} \quad (1)$$

where $E$=the voltage developed across a coil, $N$=the number of windings or turns in the coil and $d\phi/dt$ is the rate of change of flux in the coil. Transposing this equation we obtain $$dt = \frac{N}{E} d\phi \quad (2)$$

Integrating both sides of Equation 2 we obtain $$t_s = \frac{N}{E} \phi \quad (3)$$

$t_s$ is the time required to saturate the core and $\phi$ is the flux required to completely saturate and thus switch the core from one of its states to the other. From Equation 3 it can be seen that the time required for transformer T2 to saturate is inversely proportional to the voltage impressed across it. Therefore, as the supply voltage increases, the pulse width decreases or becomes narrower since as shown in Equation 3 the higher voltage saturates transformer T2 much faster. Similarly, as the supply voltage decreases, the pulse width becomes wider because T2 will not saturate as quickly. Since the primary winding of transformer T3 in the power amplifier is supplied on line 4 with power from the same voltage source as is transformer T2 and modulator-driver 8, the product of the voltage across the primary winding of T3 and the length of time that it is impressed thereon is held constant even though the voltage levels of the supply voltage changes. Further T3 is wound such that it will not saturate even though the full input voltage is impressed thereon for the full oscillator half cycle.

Consider FIG. 3 which shows the waveforms present at points A, A', B, B', C, C', D and E shown in FIG. 2. Consider first the waveforms with solid outlines. These waveforms are present when the input voltage is at its nominal value and when the output voltage is constant at its nominal value. It will be seen that waveforms at points A and A' are equal in amplitude and length and represent the voltages present across windings 34 and 36 of T1 during the oscillation of oscillator 6. Since the primary windings 46 and 48 of transformer T2 in the modulator-drive 8 saturates before transformer T1, i.e. within 80% of the time that T1 saturates, it will be seen that the pulses present at points B and B' are of shorter duration than those caused by the oscillation of oscillator 6. The waveforms at points B and B' are the same as those at points C and C' since they are coupled through transformer T2. Because power amplifier 10 operates in a push-pull arrangement, the waveforms at point D will consist of the sum of those waveforms at points C and C' multiplied by a transformer ratio factor. These waveforms are rectified and filtered by circuit 22 which produces a constant D.C. level voltage at point E. Assume now that the output voltage remains constant but the input voltage decreases. The waveforms developed at points A and A' will remain the same because the oscillator frequency will not change since zener diode 32 is providing a constant voltage to coils 34 and 36. However, the input voltage on line 4 is coupled through R7 to the primary windings of transformer T2 in modulator-driver 8 and is also coupled to transformer T3 in power amplifier 10; therefore, the product of the voltage across the primary windings of transformer T3 and the length of time that it is impressed thereon, which is determined by the length of the pulse from modulator-driver 8, is held constant even though the voltage levels of the supply voltage change. As stated previously, transformer T3 is wound such that its core will not saturate even though the primary voltage is impressed across it for the full oscillator half cycle. Therefore, no large current spikes occur through the transistors to which the primary windings of transformer T3 are coupled. The output of transformer T3 is rectified and filtered by circuit 22 to provide the required output voltage. It is also clear that if more than one output voltage is desired, more than one output winding may be coupled to the primary windings of transformer T3; such a circuit is shown generally in FIG. 2 by the numeral 50. The voltage waveforms at point B and point C as shown by the dotted lines in FIG. 3 have decreased in amplitude since the input voltage has decreased but have increased in length since transformer T2 now requires a longer time to saturate with a lower input voltage. Thus, the output pulse at point C contains the same volt-second product as when the input voltage was at its nominal level. Therefore, the output voltage remains constant even though the input voltage varies. With transformer T2 wound so that it saturates within 80% of the time required for transformer T1 to saturate, it will be seen that the input voltage can decrease to an amount that will cause the saturation time of T2 to equal T1. After that point, no further regulation can occur.

Feedback control circuit 26 is used to maintain the output voltage at a constant level even though it is connected to varying loads which tend to change the output voltage. Zener diode 54 which is coupled between an output voltage through R8 to ground potential is used to establish a constant supply voltage for feedback control 26. Zener diode 56, which is coupled in series with resistor 58, is used to establish a reference voltage which is coupled to the base of transistor 60. Transistors 60 and 62 are coupled together in such a manner as to form a differential amplifier 52. Thus, with the reference voltage established by zener diode 56 on the base of transistor 60 and with the output voltage from rectifier-filter 22 coupled to the base of transistor 62, differential amplifier 52 will produce an output on line 64 whenever these two voltages are unequal. The output from differential amplifier 52 on line 64 is coupled to the base of transistor 66. Transistor 66 acts as an emitter follower which is in series with resistor 68 between the reference supply voltage established by zener diode 54 and ground potential. Thus, the voltage developed across the emitter and collector of transistor 66 is dependent upon the signal from differential amplifier 52 on line 64 which is coupled to the base of transistor 66. Conductors 30 alternately coupled the voltage developed across transistor 66 to coils 38 and 40 of transformer T1 in oscillator 6 through diodes 70 and 72. Thus, any changes in the output voltage are detected and signals are produced which are coupled to transformer T1 of oscillator 6. It will be remembered that oscillator 6 oscillates at a frequency which is determined by the voltage appearing across coils 34 and 36. This voltage is determined by the voltage clamp impressed across coils 38 and 40 from feedback control 26; thus, as the output voltage changes and this change is amplified and coupled to coils 38 and 40 of transformer T1, the oscillation frequency of oscillator 6 changes accordingly. In actual practice it has been found that zener diode 32 is not needed to provide a constant reference voltage to transformer T1. The feedback voltage from feedback circuit 26 is sufficient to compensate for input voltage variations at the junction of R2 and R4 provided the gain of the feedback loop is high enough.

Under normal operating conditions the voltage coupled from feedback control unit 26 to transformer T1 in oscillator 6 is of such a value as to cause oscillator 6 to operate at a frequency which will cause the proper output voltage to be produced from rectifier-filter unit 22. Assume now that the load coupled to rectifier-filter 22 varies such that the output voltage begins to decrease. This decrease in voltage is coupled to the base of transistor 62 of differential amplifier 52 in feedback control 26 causing transistor 62 to conduct less current. When transistor 62 conducts less current, less voltage is developed across common emitter resistor 74. Since less voltage is developed across resistor 74, transistor 60 conducts more current which causes a greater voltage drop across collector resistor 76 which in turn causes a lower voltage to appear on line 64 which is coupled to the base of transistor 66. Thus, transistor 66 conducts less and causes a greater voltage between its collector and emitter terminals which is coupled to coils 38 and 40 of transistor T1. Since more voltage is developed across coils 38 and 40, this causes a greater voltage to be developed across coils 34 and 36 which in turn causes oscillator 6 to increase its frequency of operation. As has been explained earlier and as is well known in the art, a transformer with square loop core material will saturate depending upon the voltage impressed upon the transformer and the length of time that voltage is impressed thereon. Since the voltage applied to the transformer T1 has increased, it will saturate more rapidly than previously and thus will increase its frequency of operation.

Consider now FIG. 4 which is similar to FIG. 3 and which shows waveforms at various points in the circuit when the output voltage decreases. As FIG. 4 is compared with FIG. 3, it will be seen that the waveforms at points A and A' are of shorter duration in FIG. 4 or in other words, oscillator 6 has increased its frequency. It will be noted however, that the waveforms at points B, B', C and C' have not changed but are of the same length and amplitude. This occurs because the input voltage to the modulator-driver 8 on line 4 has remained constant and because the time required for modulator-driver 8 to saturate depends upon the magnitude of the input voltage. Thus, modulator-driver 8 continues to produce the same size square wave pulse as it did before the output voltage decreased. However, since oscillator 6 has increased its frequency, and thus the frequency of the square waves being applied to modulator-driver 8 has increased, the total number of square wave pulses appearing at point D have increased and, when averaged by rectifier-filter circuit 22, the output voltage at point E increases thus tending to raise the output voltage back to its nominal level.

Considering FIG. 2 again, assume that the output voltage increases. This increase is coupled to the base of transistor 62 in feedback control 26 causing it to conduct more current and thus raising the voltage developed across common emitter resistor 74. This in turn causes transistor 60 to conduct less and thus less voltage is dropped across collector resistor 76 therefore causing a greater signal to be coupled on line 64 to the base of transistor 66. Transistor 66 then increases its conduction thus causing less voltage to be developed across its collector and emitter and consequently, causing less voltage to be coupled to coils 38 and 40 of transformer T1 in oscillator 6. Since less voltage is coupled to transformer T1, oscillator 6 decreases its frequency of operation since with less voltage coupled to transformer T1 it takes a longer time to saturate and therefore oscillator 6 decreases its frequency of operation.

Consider now FIG. 5 which is similar to FIG. 3 in that it shows the waveforms at various locations in the circuit when the output voltage increases. Notice first the waveforms at points A and A' in oscillator 6. Since less voltage is being coupled back to transformer T1 in oscillator 6, it takes a greater length of time for transformer T1 to saturate and thus the frequency of operation of oscillator 6 is decreased as evidenced by the pulses of greater length as shown in FIG. 5. It will be noted again that the waveforms at point B or B' or C or C' have the same amplitude and length as when the output voltage is at its nominal value. The reason for this as was explained previously is that the input voltage on line 4 is constant and therefore transformer T2 continues to saturate in the same length of time as it had previous to the increase in the output voltage. However, the number of input pulses from oscillator 6 to modulator-driver 8 has decreased and, therefore, the number of output pulses from modulator-driver 8 has also decreased; thus, as shown in FIG. 5, the waveforms at point D are of the same width as shown at FIG. 4 but they now occur less frequently and when averaged over one cycle by the rectifier-filter circuit 22, the average voltage is decreased, thus tending to reduce the output voltage on line 24.

If it is desired, the complementary square wave pulses on lines 20 from power amplifier 10 may be used to drive a varying electrical load. If the circuit is so used, regulation of the average voltage being coupled to that load will still occur through using rectifier 22 to produce the average D.C. voltage contained by the pulses and then controlling the frequency of the oscillator as already described. In other words, the exact circuit shown in FIG. 2 would be used with the addition that the load would be connected to conductor 20 between the power amplifier 10 and rectifier 22.

The switching circuit shown in FIG. 6 uses oscillator 6, modulator-driver 8, power amplifier 10 and feedback control 26 all of which operate in the same manner as has been previously discussed. The output leads 20 of the secondary winding of the transformer in power amplifier 10 are coupled to the base and the emitter of switching transistor 78 for turning it on and off. Since the input voltage on line 80 is a high voltage which is to be regulated, the control voltage produced by power amplifier 10 and applied to the base of transistor 78 is also a high voltage very close to the input voltage. During initial operations, oscillator 6 immediately begins to operate and supply pulses to modulator-driver 8 on lines 12 and 14. As previously explained, modulator-driver 8 regulates the output voltage with variations of input voltages. Oscillator 6 receives its input power on line 4 through diode 82 from voltage divider network 84. Voltage divider 84 reduces the high input voltage on line 80 to a value which can be used by the oscillator 6. For reasons which will be given later, this voltage will be lower than the lowest regulated value of the output voltage. The pulses on lines 12 and 14 are coupled to the primary winding of the transformer in modulator-driver 8. The center tap of the primary winding of modulator-driver 8 receives its voltage from voltage divider network 86 through amplifier 88. Amplifier 88 is needed to provide a low impedance output to match the input of modulator-driver 8. The output of modulator-driver 8 on lines 16 and 18 is coupled through transistors to the primary winding of the transformer in power amplifier 10. The center tap of the primary winding of the transformer in power amplifier 10 receives its voltage from conductor 4 through rectifier 82 from voltage divider network 84.

As stated above, oscillator 6 immediately begins to operate during initial operations and supplies pulses to modulator-driver 8 even though there is no output voltage and thus no feedback voltage. The output pulses from modulator-driver 8 are amplified by power amplifier 10 and used to turn transistor 78 on and off. As soon as there is an output voltage developed, this voltage is coupled to feedback network 26 via conductor 28. The output of feedback network 26 on lines 30 is coupled to the oscillator 6 in the manner previously explained to cause the frequency of the oscillator to increase and thus increase the duty cycle of transistor 78 which in turn causes the output voltage to increase. When the output voltage reaches its regulated value which is higher than the voltage developed by divider network 84, diode 82 will be reverse biased and will stop conducting. The voltage on line 4 which is necessary for the operation of the ocillator 6, the power amplifier 10 and the feedback circuit 26, will then be obtained through diode 90 from the regulated output voltage. Obviously the voltage to line 4 could continuously be furnished by voltage divider 84 or an auxiliary power supply could be used. However, if it is desired that the regulated output voltage be used for this source, then it is necessary that another source be used until an output voltage is developed and then the other source may be disconnected. The circuit shown in FIG. 6 and described above discloses one way in which this could be done. Diode 92 in filter circuit 94 is known as a "free wheeling" diode and is used to provide an alternate path for current flow so that transistor 78 can be turned off.

In summary, it will be seen that the present invention provides an output voltage that is regulated against both load variations and input voltage amplitude variations. Modulator-driver 8 is a saturable reactor comprising a transformer constructed of square loop core material which has both a center-tapped primary winding for receiving via resistor R7 the input voltage which is subject to amplitude variations and a center-tapped secondary winding for producing complementary output pulses which are amplified and rectified to produce the desired output voltage. Since the reactor saturates in a time depending upon the voltage applied to it, it can be seen that an increase in applied voltage will cause the reactor to saturate in a shorter time. Therefore, a pulse will be produced which is larger in amplitude but shorter in duration. Similarly, if the applied voltage decreases, an output pulse is produced which is smaller in amplitude but longer in length. Thus, the energy of the pulses or the voltage-second product of each output pulse remains constant even though the applied voltage varies.

The complementary square wave pulses coupled to the modulator-driver 8 are produced by oscillator 6. Oscillator 6 is a transformer-coupled multivibrator that is also formed of square loop core material which also saturates depending upon the magnitude of the voltage coupled to its windings. The input voltage which is subject to variations is coupled to zener diode which produces a constant reference voltage to be applied to the windings of transformer $T_1$ in oscillator 6. Therefore, oscillator 6 produces complementary square wave pulses of constant frequency which are coupled to modulator-driver 8. If the input voltage is constant, modulator-driver 8 will produce constant amplitude, constant length square wave pulses. Thus, the spacing of the pulses which is caused by the oscillator frequency determines the average value of the rectified D.C. output. This principle can then be used to control the output voltage against changing when the load conditions vary. Feedback control circuit 26 monitors the output voltage and compares it with a reference voltage. If the output voltage varies with respect to the reference voltage, circuit 26 produces a control voltage which is coupled to one of the windings of oscillator 6 to change its frequency. If its frequency increases, the constant amplitude, constant length pulses from the modulator-driver 8 are more closely spaced together and the average output voltage increases. In a like manner, if the frequency decreases, the constant amplitude, constant length pulses from the modulator-driver 8 are more widely spaced and the average output voltage decreases.

It is obvious that any of the transistors used herein may be of the NPN or PNP types as long as the proper bias voltages are used.

It is understood that suitable modifications may be made in the structure as disclosed provided such modifications come within the spirit and scope of the appended claims. Having now, therefore, fully illustrated and described our invention, what we claim to be new and desire to protect by Letters Patent is:

1. A D.C. to D.C. converter comprising:
   (a) an input terminal for receiving an input voltage,
   (b) a saturable reactor having signal and drive terminals, said signal terminal being connected to said input terminal, said reactor producing complementary output pulses whose amplitude and length vary with variations in said input voltage but whose voltage-time product remains constant,
   (c) an output terminal coupled to said reactor for receiving said complementary output pulses, and
   (a) a transformer coupled oscillator being formed of square loop core material and having a plurality of windings thereon, said windings being coupled to said input terminal and said output terminal and at least one of said windings connected to said drive terminals of said saturable reactor for varying the frequency of occurrence of said complementary output pulses under varying load conditions.

2. A D.C. to D.C. power supply for providing a substantially constant output voltage with variations in both load conditions and input voltage amplitude comprising:
   (a) an input terminal for receiving input voltage,
   (b) a saturable reactor coupled to said input terminal for producing complementary square wave output pulses whose amplitude and length vary with variations in said input voltage but whose voltage-time product remains constant, said reactor comprising:
      (1) a transformer having square loop core material capable of being magnetically saturated, said transformer comprising:
         (i) a center-tapped primary winding with the center tap coupled to said input terminal for receiving said input voltage and with both ends of said primary winding receiving signals to vary the frequency of said complementary output pulses, and
         (ii) a center-tapped secondary winding for producing said complementary output pulses when said transformer saturates, and
      (2) a resistor coupled between said input terminal and said primary winding center-tap to maintain the voltage across said primary winding directly proportional to said input voltage during the time said transformer is not saturated,
   (c) a rectifier-filter circuit coupled to said secondary winding of said reactor for receiving said complementary square wave pulses and providing a substantially constant average output voltage,
   (d) an output terminal coupled to said rectifier-filter circuit for receiving said constant average output voltage, and
   (e) means coupled to said reactor, said input terminal and said output terminal for varying the frequency of occurrence of said complementary square wave output pulses under varying load conditions thereby causing said rectifier-filter circuit to provide said substantially constant average output voltage, said means comprising:
      (1) a feedback control circuit coupled to said output terminal for receiving said substantially constant average output voltage and producing a control voltage inversely proportional to variations in magnitude of said output voltage,
      (2) a transformer-coupled oscillator being formed of square-loop core material and which has a plurality of windings thereon, a first one of said plurality of windings receiving said input voltage for causing said oscillator to produce complementary output signals on a second one of said plurality of windings,
      (3) means coupling a third one of said plurality of windings to said feedback control circuit for receiving said control voltage whereby the frequency of said oscillator is varied, and
      (4) means for coupling the output signals from both ends of said second one of said plurality of windings to the corresponding ends of the primary winding of said saturable reactor whereby the frequency of occurrence of said complementary square wave output pulses from said reactor is varied while maintaining D.C. isolation from output to input.

References Cited

UNITED STATES PATENTS

| | | | |
|---|---|---|---|
| 2,987,665 | 6/1961 | Thompson | 321—2 X |
| 3,191,115 | 6/1965 | Lloyd | 321—16 X |
| 3,197,691 | 7/1965 | Gilbert | 321—18 |
| 3,219,906 | 11/1965 | Keller et al. | 321—18 |
| 3,219,907 | 11/1965 | Josephson | 321—18 |
| 3,242,414 | 3/1966 | Zelina | 321—18 |
| 3,275,948 | 9/1966 | Rosenbusch | 331—113 |
| 3,295,043 | 12/1966 | Massey | 321—2 |

JOHN F. COUCH, *Primary Examiner.*

WARREN E. RAY, *Examiner.*

W. H. BEHA, Jr., *Assistant Examiner.*